(12) United States Patent
Wehrmann

(10) Patent No.: US 11,584,592 B2
(45) Date of Patent: Feb. 21, 2023

(54) BELT TENSIONER FOR A CONVEYOR BELT

(71) Applicant: Bizerba SE & Co. KG, Balingen (DE)

(72) Inventor: Johann Wehrmann, Balingen (DE)

(73) Assignee: Bizerba SE & Co. KG, Balingen (DE)

( * ) Notice: Subject to any disclaimer, the term of this patent is extended or adjusted under 35 U.S.C. 154(b) by 0 days.

(21) Appl. No.: 17/505,063

(22) Filed: Oct. 19, 2021

(65) Prior Publication Data
US 2022/0119199 A1    Apr. 21, 2022

(30) Foreign Application Priority Data

Oct. 20, 2020 (EP) .................................... 20202823

(51) Int. Cl.
*B65G 23/44* (2006.01)
*B65G 15/30* (2006.01)
*B33Y 80/00* (2015.01)

(52) U.S. Cl.
CPC ............. *B65G 23/44* (2013.01); *B65G 15/30* (2013.01); *B33Y 80/00* (2014.12); *B65G 2203/0258* (2013.01)

(58) Field of Classification Search
CPC ......... B33Y 80/00; B65G 23/44; B65G 15/30
USPC ................................................. 198/813, 814
See application file for complete search history.

(56) References Cited

U.S. PATENT DOCUMENTS

| | | | | |
|---|---|---|---|---|
| 5,164,777 A * | 11/1992 | Agarwal | .............. | G03G 15/755 198/841 |
| 6,216,848 B1 * | 4/2001 | Zens | .................... | B65H 11/005 198/689.1 |
| 6,578,705 B2 * | 6/2003 | Lunghi | .................. | B65G 15/00 198/810.04 |
| 6,599,209 B1 | 7/2003 | Ullein et al. | | |
| 6,843,365 B2 * | 1/2005 | Baker | ..................... | B65G 47/54 198/813 |

(Continued)

FOREIGN PATENT DOCUMENTS

| | | | | |
|---|---|---|---|---|
| CN | 108908471 A | * | 11/2018 | ............. B65G 23/44 |
| DE | 200 20 350 U1 | | 2/2002 | |

(Continued)

OTHER PUBLICATIONS

European Search Report dated Apr. 6, 2021 of corresponding European Patent Application No. 20202823.9 (three pages).

*Primary Examiner* — James R Bidwell
(74) *Attorney, Agent, or Firm* — Kilpatrick Townsend & Stockton LLP

(57) ABSTRACT

Disclosed is a belt tensioner having a single-piece plastic body, having a fastening section, that has an adjustment mechanism via which the plastic body can be adjustably fastened, to the carrier; a pressing section configured to press against the drive belt in order to tension the drive belt; and a spring joint device which connects the fastening section and the pressing section to one another, and via which the pressing section is displaceably supported at the fastening section along the deflection direction so that, when the pressing section presses against the drive belt, the amount of the displacement of the pressing section along the deflection direction is dependent on the respective set drive belt tension, wherein the belt tensioner has a setting aid that indicates when the predefined drive belt tension is set by the belt tensioner.

21 Claims, 5 Drawing Sheets

(56) References Cited

U.S. PATENT DOCUMENTS

| | | | |
|---|---|---|---|
| 10,935,446 B2 | 3/2021 | Fritsch et al. | |
| 2005/0284734 A1* | 12/2005 | Rettore | B65G 23/16 |
| | | | 198/833 |
| 2006/0217223 A1 | 9/2006 | Schmid et al. | |
| 2007/0173362 A1 | 7/2007 | Ullein | |
| 2008/0142341 A1* | 6/2008 | Layne | B65G 23/44 |
| | | | 198/813 |
| 2016/0090243 A1* | 3/2016 | Aliesch | B60P 1/38 |
| | | | 198/832.3 |
| 2018/0319602 A1* | 11/2018 | German | B65G 15/62 |

FOREIGN PATENT DOCUMENTS

| | | |
|---|---|---|
| DE | 10 2005 039 737 A1 | 3/2007 |
| DE | 20 2015 104 860 U1 | 12/2015 |
| EP | 1 723 349 B1 | 11/2006 |
| EP | 3 671 142 A1 | 6/2020 |

* cited by examiner

BELT TENSIONER FOR A CONVEYOR BELT

This application claims priority to European Patent Application 20202823.9, filed on Oct. 20, 2020, the disclosure of which is incorporated by reference herein.

The invention relates to a belt tensioner for setting and maintaining a predefined tension of a drive belt for driving a deflection roller of a conveyor belt, in particular of a weighing conveying apparatus for goods, in particular of a price labeler.

A conveyor belt typically comprises a belt body having two deflection rollers around which a transport belt of the conveyor belt revolves. In this respect, one of the two deflection rollers, which is also designated as the drive roller, is driven by a motor and the other deflection roller runs with it. It is also known that in the case of two conveyor belts that are e.g. arranged directly behind one another, only one motor is used for both conveyor belts. The drive roller of the one conveyor belt is then driven directly by the motor and a deflection roller of the other conveyor belt is driven by the drive roller of the one conveyor belt via a drive belt.

Belt tensioners are in this respect used to ensure a sufficiently large enclosing of the driving deflection roller and of the driven deflection roller and to set the correct belt tension. In this respect, belt tensioners are known that are displaceably installed at a carrier and that are displaced as a whole with respect to the drive belt in order to tension the drive belt. Furthermore, multi-part belt tensioners are known that are installed at the carrier in a non-displaceable manner, wherein a relative position between the part which presses against the drive belt and the part via which the belt tensioner is installed at the carrier can be fixedly set, however. In the case of both known types of belt tensioners, an iterative procedure is followed to set the desired belt tension, i.e. the belt tensioner is first roughly set and then the belt tension is measured. A readjustment and a repeat measurement then take place. Readjustment is in this respect carried out until the belt tension corresponds to the desired or predefined belt tension. However, such an approach is cumbersome.

It is the underlying object of the invention to provide a belt tensioner of the initially named kind in which the predefined belt tension can be set in a simple manner.

This object is satisfied by the features described herein, and in particular in that the belt tensioner has a single-piece plastic body that is in particular formed with mirror symmetry to a central plane. The plastic body comprises a fastening section, in particular having a base plate, for fastening the plastic body to a carrier, in particular to a conveyor belt carrier, wherein the fastening section has an adjustment mechanism via which the plastic body can be adjustably fastened, in particular vertically adjustably fastened, to the carrier; a pressing section, in particular having a rear wall, that is configured to press against the drive belt in order to tension the drive belt; and a spring joint device which connects the fastening section and the pressing section to one another, which is elastically yielding along a deflection direction, and via which the pressing section is displaceably supported at the fastening section along the deflection direction so that, when the pressing section presses against the drive belt, the amount of the displacement of the pressing section along the deflection direction is dependent on the respective set drive belt tension, wherein the belt tensioner has a setting aid that indicates when the predefined drive belt tension is set by the belt tensioner. The carrier can be a carrier of a frame of the initially mentioned weighing conveying apparatus for goods, in particular a conveyor belt carrier.

In accordance with the invention, the respective set drive belt tension can be concluded from the amount of the displacement of the pressing section with respect to the fastening section, i.e. from the value as to how far the pressing section is displaced with respect to the fastening section on the tensioning of the drive belt. The desired or predefined tension is therefore accompanied by a defined relative position between the pressing section and the fastening section. To set the predefined drive belt tension, the fastening section is then adjusted via the adjustment mechanism, with the pressing section pressing against the drive belt, until the defined relative position between the pressing section and the fastening section is reached, wherein the predefined drive belt tension is then automatically set. The installed setting aid in this respect indicates when the defined relative position has been reached. The predefined belt tension is therefore particularly easily settable.

Since the fastening section, the pressing section, and the spring joint device are formed as a single-piece plastic body, a measurement or checking of the drive belt tension can be omitted since such a plastic body can be produced with a high degree of accuracy so that it can be ensured that, in the defined relative position, the drive belt tension that is thereby set is always within the permitted tolerance limits for the predefined drive belt tension.

The belt tensioner in accordance with the invention uses part aspects of both types of belt tensioners known from the prior art. The adjustable fastening of the belt tensioner to the carrier is taken over from the first type; the adjustability of the belt tensioner in itself is taken over from the second type. However, this combination alone does not provide any advantages with respect to the prior art. The measurement or checking of the drive belt tension can only be omitted since the fixed settability and the multi-part design are not simultaneously also taken over from the second type, but an elastically yielding spring joint device is used instead that is furthermore formed as a single-piece plastic body together with a fastening section and a pressing section, and it is only for this reason that the combination of the aforementioned part aspects of the two types of belt tensioners known from the prior art makes any sense at all.

The adjustment mechanism preferably comprises an elongate hole arrangement, with the plastic body being fastenable in a linearly displaceable manner to the carrier via the elongate hole arrangement and at least one fastening screw that can be inserted therein. Due to an elongate hole arrangement, the adjustability of the belt tensioner and thus the setting of the tension of the drive belt can be achieved in a simple manner.

The elongate hole arrangement can comprise at least two elongate holes, in particular exactly two elongate holes, that extend in parallel with one another. In this respect, it is preferred if the two elongate holes are formed in the base plate of the fastening section. The linear displaceability of the belt tensioner can be ensured in a simple manner by a plurality of elongate holes extending in parallel with one another. The elongate holes are in particular oriented in parallel with the deflection direction, whereby a transverse load on the spring joint device can be avoided during the adjustment.

The setting aid is preferably configured such that the fastening section and the pressing section each have a linear surface feature, for example an edge, with the two linear surface features being aligned with one another at the predefined drive belt tension. The predefined drive belt tension can then be easily read off from the two mutually aligned linear surface features.

Provision can in particular be made that the spring joint device has an elastic yield in a direction perpendicular to the base plate of the fastening section, said elastic yield amounting to at most 5%, in particular at most 1%, of the elastic yield of the spring joint device in the deflection direction. Any displacement of the pressing section in the direction toward the base plate or away from the base plate can hereby be at least largely prevented.

It is furthermore preferred if the spring joint device has two spring joint regions, the fastening section has two support webs, in particular L-shaped support webs, projecting from the base plate and the pressing section has two support walls that project from the rear wall of the pressing section in the same direction as the support webs and that are arranged between the two support webs, with the one spring joint region being formed between the one support web and the one support wall and the other spring joint region being formed between the other support web and the other support wall. The pressing section is thus not only supported in a spring-elastic manner at one position, but at two mutually oppositely disposed sides, whereby more flexibility is produced in the design of the spring joint device in a geometric aspect. Furthermore, a symmetry can hereby be achieved that allows a particularly precise setting of the predefined drive belt tension.

The two spring joint regions can each have a web extending in a meandering manner, with the one end of the respective web being molded to the respective support web and the other end of the respective web being molded to the respective support wall. Such webs extending in a meandering manner have proven to be particularly suitable for implementing the desired elastically yielding properties of the spring joint device.

The two webs extending in a meandering manner each have a depth perpendicular to the base plate of the fastening section and a height in the direction of the deflection direction, with the ratio of depth to height amounting to at least 1.0, in particular at least 1.5. With this geometry of the webs extending in a meandering manner, the deflection direction can be well defined and in particular any displacement of the pressing section in the direction toward the base plate or away from the base plate, as mentioned above, can be at least largely prevented.

In general, the pressing section can be configured to press directly or indirectly against the drive belt. In the direct variant, the drive belt slides over the pressing section, which—in particular depending on the drive belt used—could, however, under certain circumstances lead to a more irregular running and to an increased wear of the drive belt. Therefore, in accordance with a preferred embodiment, provision is made that the belt tensioner comprises a wheel that is rotatably supported at the pressing section of the plastic body, with the pressing section being configured to press indirectly via the wheel against the drive belt in order to tension the drive belt. In this respect, it is preferred if the wheel is configured as a toothed wheel and the drive belt is configured as a toothed belt, whereby a particularly defined cooperation between the wheel and the drive belt can be ensured. In general, the wheel can be disk-shaped or cylinder-shaped.

For this purpose, the pressing section can comprise a fixed axle stub onto which the wheel is rotatably placed, in particular via a ball bearing, with the wheel being held by means of a screw that extends through a passage formed in the axle stub and that engages into a screw nut. The screw nut can be inserted in a manner secure against rotation into a cut-out which is formed in the rear wall of the pressing section and into which the passage merges or said screw nut can be arranged behind the rear wall and pulled in a manner secure against rotation against the rear wall by the screw. In this respect, provision can be made that a recess is formed in the base plate, through which recess the screw nut can be inserted into the cut-out formed in the rear wall of the pressing section or can be arranged behind the rear wall. This is a simple and inexpensive possibility of connecting the wheel to the pressing section or to the plastic body.

The plastic body is preferably produced from a material that has an isotropic modulus of elasticity that is also designated as a modulus of elasticity. The elastic behavior of the plastic body is then the same in all the spatial directions. On the manufacture of the plastic body, it is therefore not necessary to pay attention to the spatial directions since the modulus of elasticity of the spring joint device is then always the same in the deflection direction of the pressing section. In general, a plastic body having an anisotropic modulus of elasticity can also be used. However, the same anisotropy then always has to be repeatably present on the manufacture and an exact installation position has to be ensured on the installation of the belt tensioner. For example, the plastic body can be produced from a polyamide, in particular PE12.

Furthermore, it is preferred if the plastic body is manufactured by means of a 3D printing process. The plastic body can be manufactured with a high quality, as is preferred due to the above-described omission of a measurement or checking of the belt drive tension, and at the same time at low cost by a 3D printing process. If the plastic body is printed from a material having an isotropic modulus of elasticity, the plastic body can—relatively speaking—also be printed obliquely or from any desired direction such that an exact installation position does not have to be ensured. In addition, more complex geometries can be produced with a 3D printing process than with an injection molding process. The 3D printing process can in particular be a powder bed-based 3D printing process in which the workpiece is built up layer by layer. In addition to the selective laser sintering, in which the powdery material is locally sintered and fused by means of laser radiation, a process can be used in which first a heat-conducting liquid binder (fusion agent) is selectively sprayed onto the respective powder layer and—in order to enable sharp contours—a heat-inhibiting liquid separator (detailing agent) is sprayed on in the remaining region and then the respective layer is irradiated with a heat source, in particular infrared light, wherein the regions are fused with the binding agent. This process is known as Multi Jet Fusion by Hewlett Packard Inc. This process enables fine details and sharp edges, in particular also in the case of free-floating structures.

The invention further relates to a conveyor belt comprising a drive belt for driving a deflection roller of the conveyor belt; and a belt tensioner as it is described above. The belt tensioner is in particular set to the predefined drive belt tension.

The invention further relates to a weighing conveying apparatus for goods, in particular for packages, in particular a price labeler, comprising a conveyor belt as is described above.

Further advantageous embodiments of the invention are described in the dependent claims, in the description of the Figures, and in the drawing.

BRIEF DESCRIPTION OF THE DRAWINGS

The invention will be described in the following by way of example with reference to the drawing. There are shown FIG. 1 a perspective representation of a weighing conveying apparatus with a labeling apparatus that has two conveyor belts, each with a transport belt.

Figure 1:
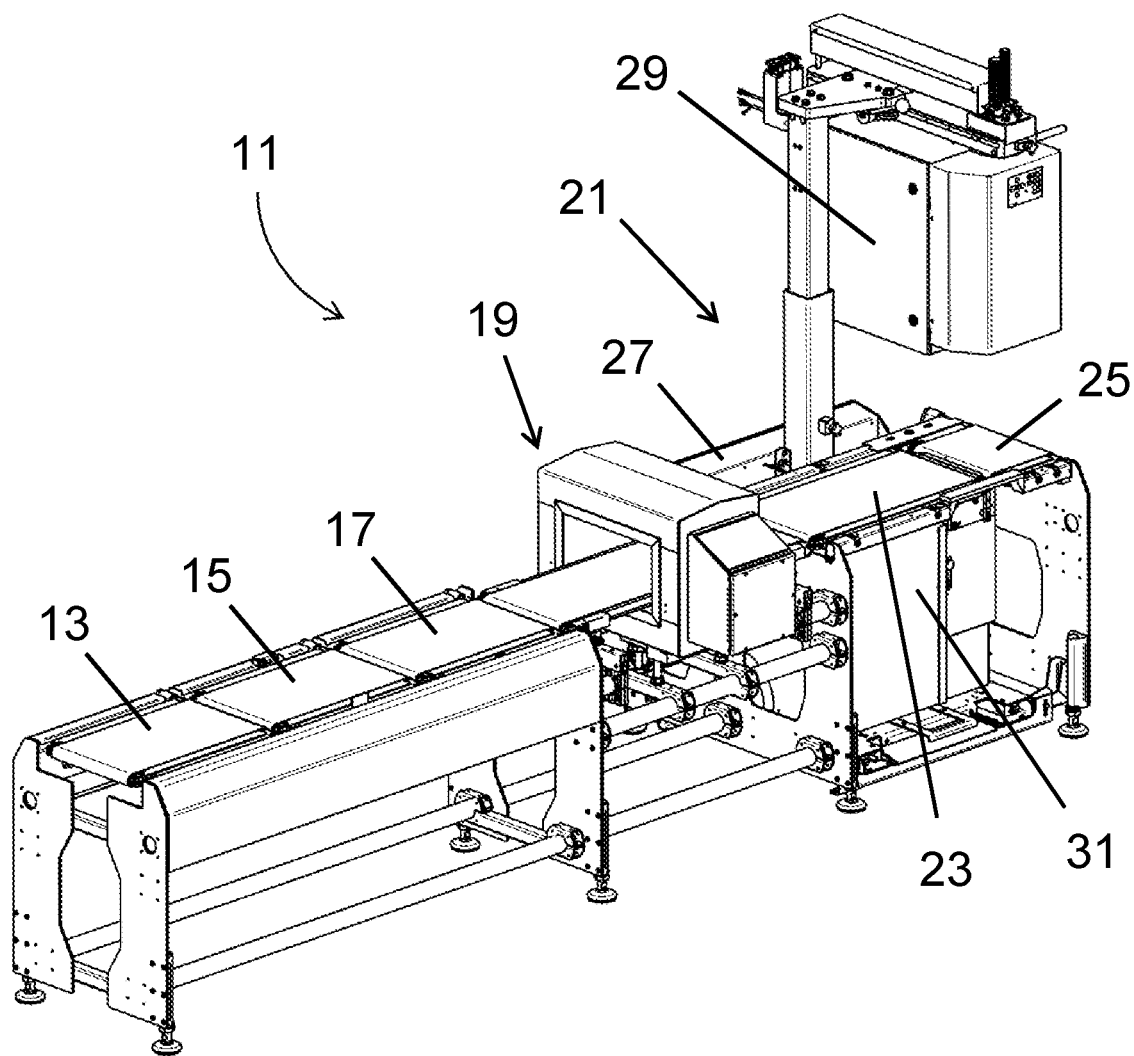

The apparatus shown in FIG. 1 shows a weighing conveying apparatus 11, in particular a price labeler, that comprises a feed belt 13; a weighing belt 15; an outfeed belt 17; a metal detector 19; and a labeling apparatus 21 having two conveyor belts 23, 25. The weighing belt 15 is coupled to a load cell that is arranged below the weighing belt 15 and that is adapted to determine the weight of an article, in particular a package, running over the weighing belt 15. In operation, the goods to be weighed are transferred from the feed belt 13 to the weighing belt 15, weighed there, and transported further to a transport belt of the metal detector 19. Subsequently, the goods are taken over by the labeling apparatus 21 and provided with a label that was previously printed with the weight determined by the load cell for the respective goods. Accordingly, the labeling apparatus 21 is a labeling apparatus including a printer. The metal detector 19 can also be omitted or a sorting device can, for example, also be provided instead of the metal detector 19 or in addition thereto. In the view in accordance with FIG. 1, a control cabinet 27 for controlling the weighing conveying apparatus 11 is provided at the rear side of the weighing conveying apparatus 11 in the region of the labeling apparatus 21.

The labeling apparatus 11 comprises a so-called top labeler 29 or a labeler for the upper package side, which is arranged above the two conveyor belts 23, 25, in order to provide goods transported on the conveyor belts 23, 25 with a label from above, i.e. at their upper sides. Furthermore, the labeling apparatus 11 comprises a so-called bottom labeler 31 or a labeler for the lower package side, which is arranged below the two conveyor belts 23, 25, in order to provide goods transported on the conveyor belts 23, 25 with a label from below, i.e. at their lower sides. For this purpose, the respective label is dispensed upwardly from the bottom labeler 31 through a gap formed between the conveyor belt 23 and the conveyor belt 25 and is applied to the goods.

Figure 2:
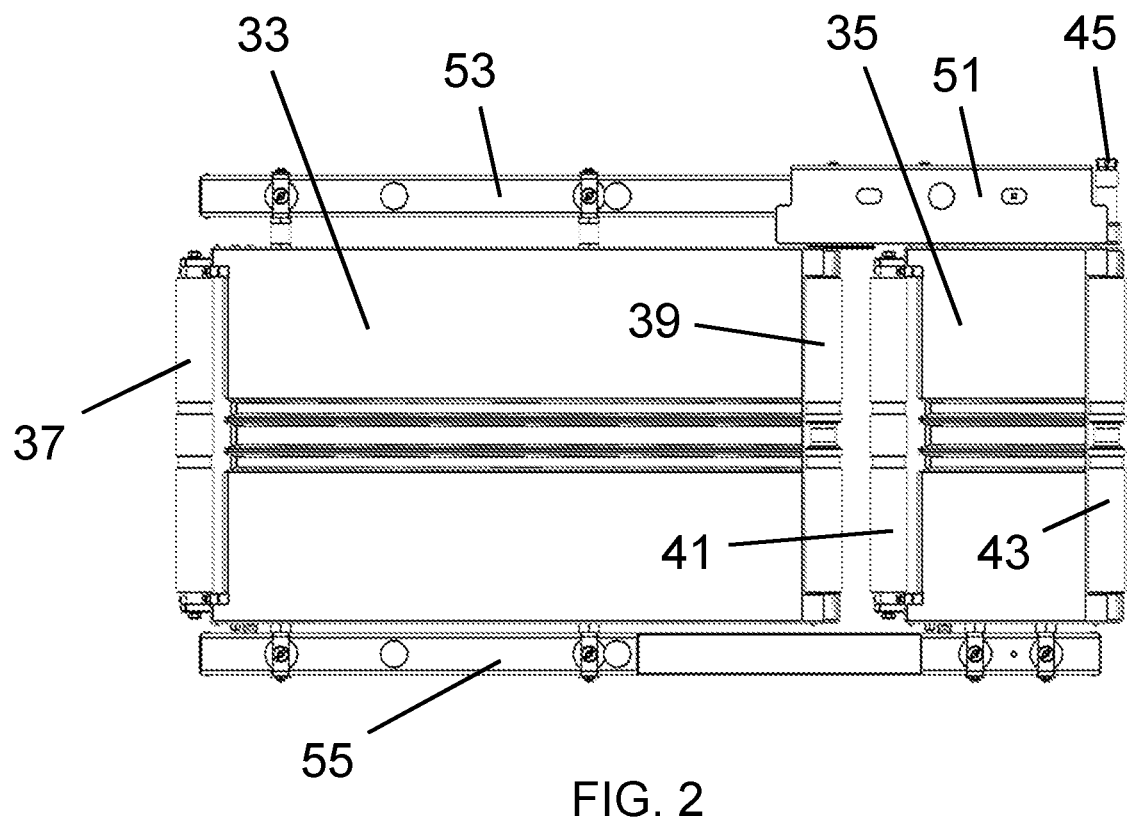
FIG. 2 a plan view of the two conveyor belts in accordance with FIG. 1, with the two conveyor belts being omitted.

FIG. 2 shows the two conveyor belts 23, 25 in a plan view. In addition to a respective transport belt (which is omitted in each case), the two conveyor belts 23, 25 each comprise a belt body 33, 35 and two deflection rollers 37, 39, 41, 43. The second deflection roller 43 of the second conveyor belt 25 is driven by a motor via a coupling 45 and the first deflection roller 41 of the second conveyor belt 25 is driven via the transport belt of the second conveyor belt 25. The first conveyor belt 23, in contrast, does not have its own motor, but is driven via a drive belt 47 (cf. FIG. 4) that extends between the driven second deflection roller 43 of the second conveyor belt 25 and the second deflection roller 39 of the first conveyor belt 23. The drive belt 47 in this respect extends to the side of the belt bodies 33, 35. The first deflection roller 37 of the first conveyor belt 23 is driven via the transport belt of the first conveyor belt 23.

Figure 3:
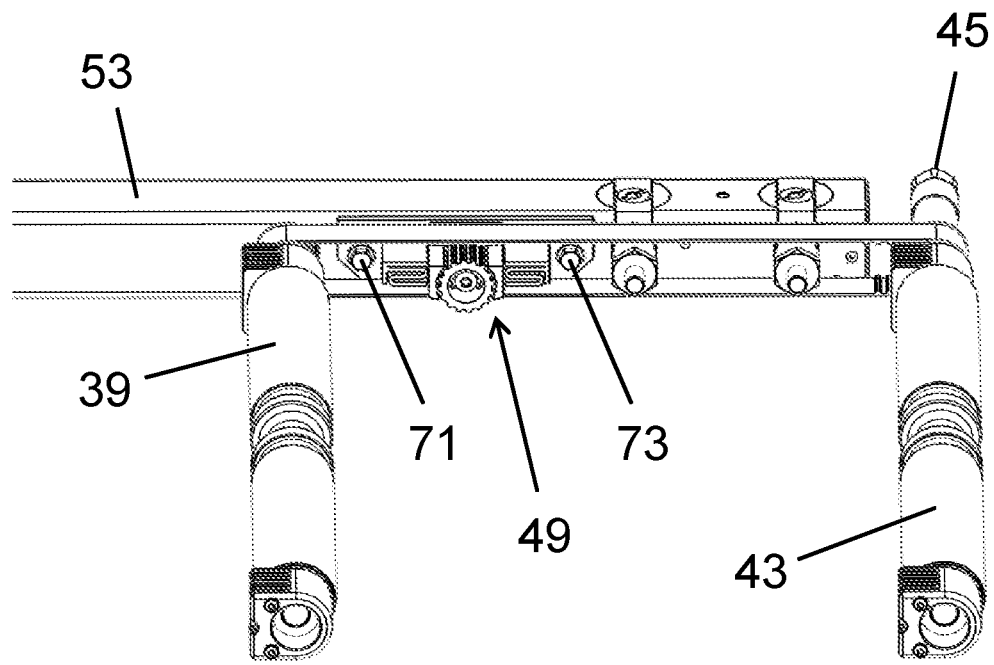
FIG. 3 a part representation of the two conveyor belts in accordance with FIG. 1 in a perspective view, with further parts being omitted.
Figure 4:
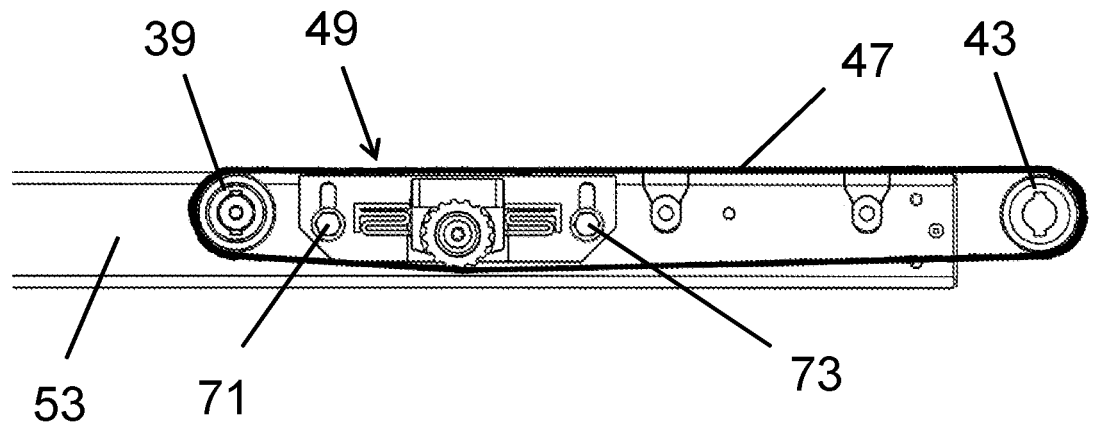
FIG. 4 the part representation in accordance with FIG. 3 in a side view.

To maintain the drive belt 47 at a predefined tension that is required for a smooth operation, a belt tensioner 49 is provided that is concealed by a cover plate 51 in FIG. 2, but can be recognized in FIG. 3 (in which the two belt bodies 33, 35 and the first deflection roller 41 of the second conveyor belt 25 are omitted) and FIG. 4. The belt tensioner 49 is arranged within the peripheral drive belt 47 and in this respect presses from above onto the inner side of the lower run of the drive belt 47 to tension the drive belt 47. In this respect, the belt tensioner 49 is fastened to a carrier 53, in particular a conveyor belt carrier 53, arranged to the side of the belt bodies 33, 35. A further carrier, in particular the conveyor belt carrier 55, is provided at the oppositely disposed side of the belt bodies 33, 35, wherein the two conveyor belts 23, 25 are supported by the two conveyor belt carriers 53, 55 and are fastened to them. In general, each belt body 33, 35 can have its own conveyor belt carrier at each side, wherein the drive belt 47 for the first conveyor belt 23 is then preferably fastened to the one of the two conveyor belt carriers of the second conveyor belt 25.

Figure 5:
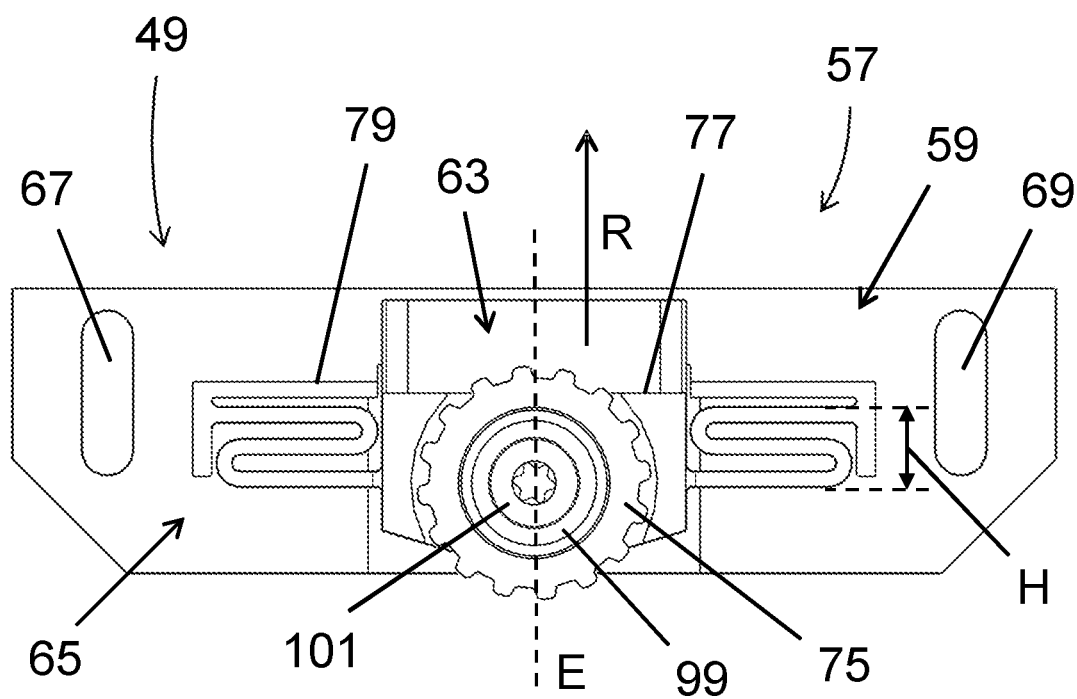
FIG. 5 a belt tensioner in accordance with the invention in a side view.
Figure 6:
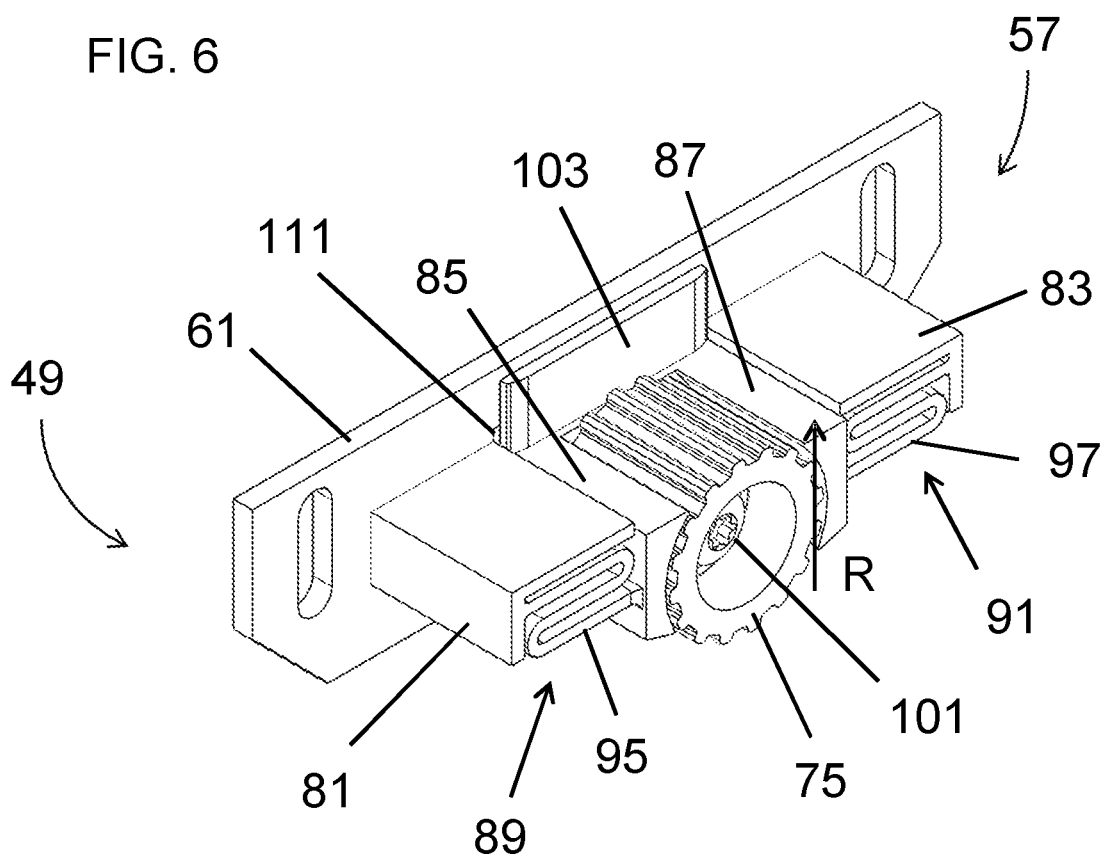
FIG. 6 the belt tensioner in accordance with FIG. 5 in a perspective view from above.
Figure 7:
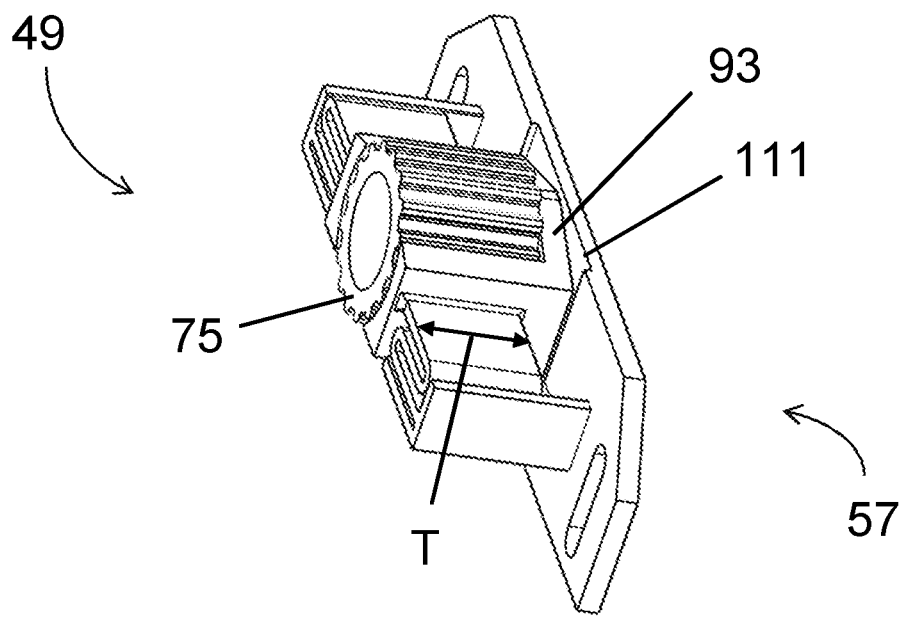
FIG. 7 the belt tensioner in accordance with FIG. 5 in a perspective view from below.

The belt tensioner 49 is shown in FIGS. 5 to 7 in the individual representation. The belt tensioner comprises a single-piece plastic body 57 that is formed with mirror symmetry to a central plane E and that has a fastening section 59 comprising a base plate 61; a pressing section 63; and an elastically yielding spring joint device 65 that connects the fastening section 59 and the pressing section 63 to one another. Via the base plate 61 and two elongate holes 67, 69 formed therein and extending in parallel with one another, the belt tensioner 49 is fastened to the conveyor belt carrier 53 by two fastening screws 71, 73 (cf. FIGS. 3 and 4). A wheel, 75, in particular a toothed wheel 75, of the belt tensioner 49 is rotatably supported at the pressing section 63 and presses against the drive belt 47 that is in particular correspondingly configured as a toothed belt 47.

The pressing section 63 is displaceable relative to the fixed fastening section 59 along a displacement direction R due to the spring joint device 65. Due to the two elongate holes 67, 69 extending in the vertical direction, the belt tensioner 49 is linearly displaceable in the vertical direction and is thus vertically adjustably fastened to the conveyor belt carrier 53. The two elongate holes 67, 69 formed in the base plate 61 thus provide an adjustment mechanism for the belt tensioner 49 via which the predefined drive belt tension can be set.

In the case shown, the spring constant of the spring joint device 65 is selected such that the predefined tension of the drive belt 47 is achieved precisely when an edge 77 of the pressing section 63 and an edge 79 of the fastening section 59, which otherwise really extend in parallel with one another, are aligned with one another. The reaching of the predefined drive belt tension on the adjustment of the fastening section 59 of the belt tensioner 49 can therefore be read off directly at the belt tensioner 49. If the pressing section 63 is displaced by a different amount with respect to the fastening section 59, the set belt tension deviates upwardly or downwardly from the predefined belt tension— depending on whether the edge 77 does not reach the edge 79 or is displaced beyond it. The belt tensioner 49 thus so-to-say forms its own setting aid.

Specifically, in the embodiment shown, the spring support of the pressing section 63 at the fastening section 59 is implemented such that the fastening section 59 has two L-shaped support webs 81, 83 projecting horizontally from the base plate 61 that is vertically fastened to the conveyor belt carrier 53, and such that the pressing section 63 has a vertically oriented rear wall 93 and two support walls 85, 87 that project in the same direction from the rear wall 93 and that are arranged between the two support webs 81, 83. Accordingly, the spring joint device 65 also has two spring joint regions 89, 91 that are formed between a respective support web 81, 83 and a respective support wall 85, 87.

As can further be seen from FIGS. 5 to 7, the two spring joint regions 89, 91 are each formed as a web 95, 97 extending in a meandering manner. The respective web 95, 97 is molded to a vertical limb of the respective L-shaped support web 81, 83 with the one end and is molded to a vertical outer surface of the respective support wall 85, 87 with the other end. The ratio of the depth T (cf. FIG. 7) to the height H (cf. FIG. 5) of the two webs extending in a meandering manner 89, 91 approximately amounts to 1.9 in the embodiment shown. Thus, it can be achieved that the elastic yield of the spring joint device 65 in the direction perpendicular to the base plate 61 can be kept negligibly small relative to the elastic yield in the deflection direction R.

Figure 8:
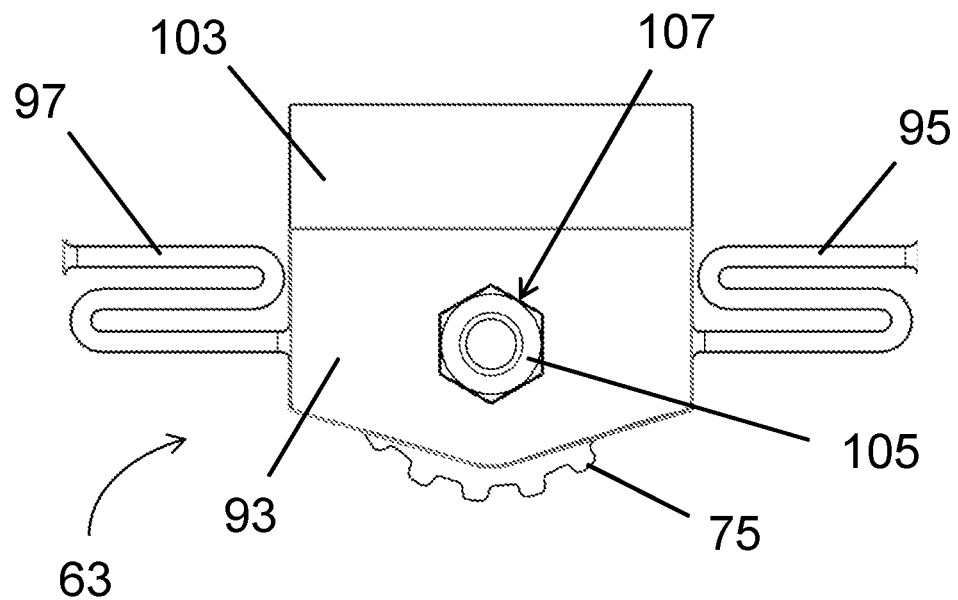
FIG. 8 a pressing section and a spring joint device of the belt tensioner in accordance with FIG. 5 in a rear view.
Figure 9:
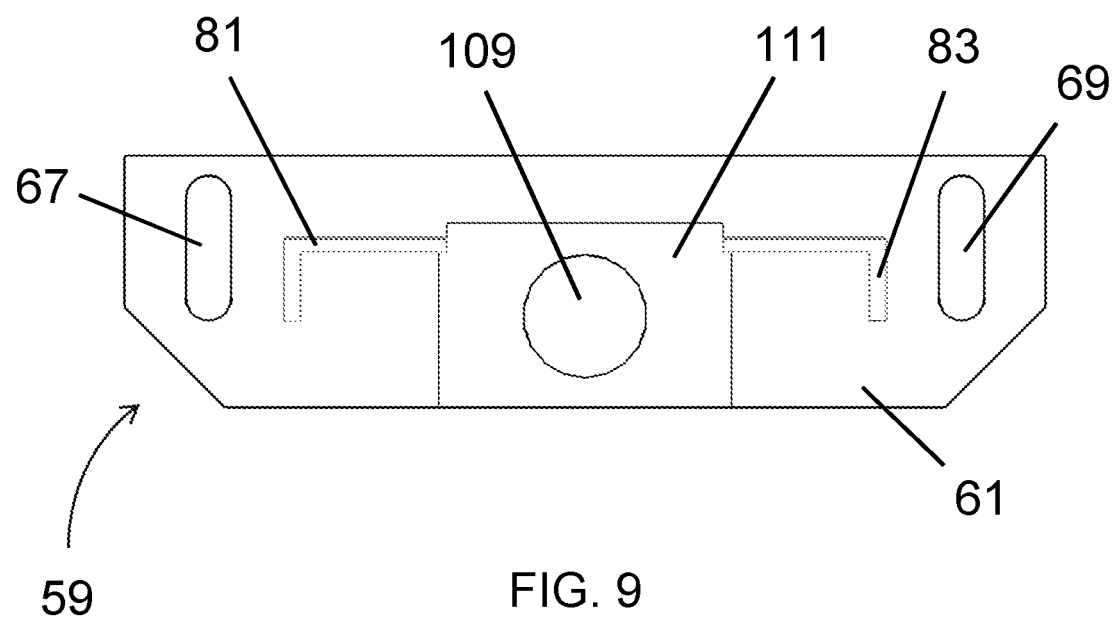
FIG. 9 a fastening section of the belt tensioner in accordance with FIG. 5 in a front view.

For the rotatable support of the toothed wheel 75 at the pressing section 63 of the plastic body 57, the pressing section 63 has a fixed, non-visible axle stub (cf. FIGS. 5 and 6) onto which the toothed wheel 75 is placed via a ball bearing 99. To hold the toothed wheel 75 at the axle stub, a screw 101 is provided that extends through a non-visible passage formed in the axle stub and that engages into a screw nut 105 with its end (see FIG. 8). The screw nut 105 is inserted in a manner secure against rotation into a cut-out 107 into which the passage merges, wherein the cut-out 107 is formed in the rear wall 93 of the pressing section 63. To be able to insert the screw nut 105 into the cut-out 107, a correspondingly larger recess 109 is provided in the base plate 61 (cf. FIG. 9). Furthermore, a shield 103 is molded to the upper side of the rear wall 93 of the pressing section 63 and covers an upper end of a depression 111, which is formed in a front side of the base plate 61, so that it can be reliably ensured that the pressing section 63 does not contact the base plate 61 or rub against it.

The plastic body 57 is produced from the polyamide PE12, i.e. a material having an isotropic modulus of elasticity, by means of a 3D printing process such that the plastic body 57 has the same elastic behavior in all the spatial directions. Larger tolerances with respect to the installation position of the belt tensioner 49 are hereby in particular possible.

REFERENCE NUMERAL LIST 11 weighing conveying apparatus
13 feed belt
15 weighing belt
17 outfeed belt
19 metal detector
21 labeling apparatus
23 conveyor belt
25 conveyor belt
27 switch cabinet
29 top labeler
31 bottom labeler
33 belt body
35 belt body
37 deflection roller
39 deflection roller
41 deflection roller
43 deflection roller
45 coupling
47 drive belt
49 belt tensioner
51 cover plate
53 carrier
55 carrier
57 plastic body
59 fastening section
61 base plate
63 pressing section
65 spring joint device
67 elongate hole
69 elongate hole
71 fastening screw
73 fastening screw
75 toothed wheel
77 edge
79 edge
81 support web
83 support web
85 support wall
87 support wall
89 spring joint region
91 spring joint region
93 rear wall
95 web
97 web
99 ball bearing
101 screw
103 shield
105 screw nut
107 cut-out
109 recess
111 depression
E central plane
H height
R deflection direction
T depth

The invention claimed is:
1. A belt tensioner for setting and maintaining a predefined tension of a drive belt for driving a deflection roller of a conveyor belt, said belt tensioner having a single-piece plastic body, comprising:
a fastening section for fastening the plastic body to a carrier, wherein the fastening section has an adjustment mechanism via which the plastic body can be adjustably fastened to the carrier;
a pressing section that is configured to press against the drive belt in order to tension the drive belt; and
a spring joint device which connects the fastening section and the pressing section to one another, which is elastically yielding along a deflection direction, and via which the pressing section is displaceably supported at the fastening section along the deflection direction so that, when the pressing section presses against the drive belt, an amount of displacement of the pressing section along the deflection direction is dependent on a set drive belt tension, wherein the belt tensioner has a setting aid that indicates when a predefined drive belt tension is set by the belt tensioner.

2. The belt tensioner in accordance with claim 1, wherein the adjustment mechanism comprises an elongate hole arrangement, with the plastic body being fastenable in a linearly displaceable manner to the carrier via the elongate hole arrangement and at least one fastening screw that can be inserted therein.

3. The belt tensioner in accordance with claim 2, wherein the elongate hole arrangement comprises at least two elongate holes that extend in parallel with one another.

4. The belt tensioner in accordance with claim 3, wherein the fastening section comprises a base plate and the elongate holes are formed in the base plate of the fastening section and/or wherein the elongate holes are oriented in parallel with the deflection direction.

5. The belt tensioner in accordance with claim 1, wherein the setting aid is configured such that the fastening section and the pressing section each have a linear surface feature, with the two linear surface features being aligned with one another at the predefined drive belt tension.

6. The belt tensioner in accordance with claim 1, wherein the fastening section has a base plate and the spring joint device has an elastic yield in a direction perpendicular to the base plate of the fastening section, said elastic yield amounting to at most 5% of the elastic yield of the spring joint device in the deflection direction.

7. The belt tensioner in accordance with claim 1, wherein the fastening section has a base plate, the pressing section has a rear wall, the spring joint device has two spring joint regions, the fastening section has two support webs projecting from the base plate and the pressing section has two support walls that project from the rear wall of the pressing section in the same direction as the support webs and that are arranged between the two support webs, with the one spring joint region being formed between the one support web and the one support wall and the other spring joint region being formed between the other support web and the other support wall.

8. The belt tensioner in accordance with claim 7, wherein the two spring joint regions each comprise a web extending in a meandering manner, with the one end of the respective web being molded to the respective support web and the other end of the respective web being molded to the respective support wall.

9. The belt tensioner in accordance with claim 8, wherein the two webs extending in a meandering manner each have a depth perpendicular to the base plate of the fastening section and a height in the direction of the deflection direction, with a ratio of depth to height amounting to at least 1.0.

10. The belt tensioner in accordance with claim 1, wherein the belt tensioner comprises a wheel that is rotatably supported at the pressing section of the plastic body, with the pressing section being configured to press indirectly via the wheel against the drive belt in order to tension the drive belt.

11. The belt tensioner in accordance with claim 10, wherein the wheel is configured as a toothed wheel and the drive belt is configured as a toothed belt.

12. The belt tensioner in accordance with claim 10, wherein the pressing section comprises a fixed axle stub onto which the wheel is rotatably placed, with the wheel being held by means of a screw that extends through a passage formed in the axle stub and that engages into a screw nut.

13. The belt tensioner in accordance with claim 12, wherein the pressing section has a rear wall and the screw nut is inserted in a manner secure against rotation into a cut-out which is formed in the rear wall of the pressing section and into which the passage merges or is arranged behind the rear wall and is pulled in a manner secure against rotation against the rear wall by the screw.

14. The belt tensioner in accordance with claim 13, wherein the fastening section has a base plate and provision is made that a recess is formed in the base plate, through which recess the screw nut can be inserted into the cut-out formed in the rear wall of the pressing section or can be arranged behind the rear wall.

15. The belt tensioner in accordance with claim 1, wherein the plastic body is produced from a material that has an isotropic modulus of elasticity and/or from a polyamide.

16. The belt tensioner in accordance with claim 1, wherein the plastic body is produced by means of a 3D printing process.

17. A conveyor belt comprising a drive belt for driving a deflection roller of the conveyor belt; and a belt tensioner in accordance with claim 1.

18. A weighing conveying apparatus for goods, comprising a conveyor belt in accordance with claim 17.

19. The belt tensioner in accordance with claim 1, wherein the plastic body is formed with mirror symmetry to a central plane.

20. The belt tensioner in accordance with claim 1, wherein the carrier is a conveyor belt carrier.

21. The belt tensioner in accordance with claim 1, wherein the plastic body can be vertically adjustably fastened.

* * * * *